United States Patent
Baig et al.

(10) Patent No.: US 11,385,909 B2
(45) Date of Patent: Jul. 12, 2022

(54) CASCADING DATA CONFIGURATION AND DATA MIGRATION

(71) Applicant: International Business Machines Corporation, Armonk, NY (US)

(72) Inventors: Mirza S. Baig, Grand Prairie, TX (US); Wen Rui Zhao, Beijing (CN); David Dwayne Weck, Santa Rosa Beach, FL (US); Ariel Jirau, Weston, FL (US); Li Xia, Beijing (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 16/734,574

(22) Filed: Jan. 6, 2020

(65) Prior Publication Data

US 2021/0208902 A1 Jul. 8, 2021

(51) Int. Cl.
*G06F 9/445* (2018.01)
*G06F 9/48* (2006.01)
*G06F 16/182* (2019.01)
*G06F 16/11* (2019.01)
*G06F 9/451* (2018.01)

(52) U.S. Cl.
CPC ............ *G06F 9/4451* (2013.01); *G06F 9/451* (2018.02); *G06F 9/4856* (2013.01); *G06F 16/119* (2019.01); *G06F 16/1824* (2019.01)

(58) Field of Classification Search
CPC ...... G06F 9/4451; G06F 9/4856; G06F 9/451; G06F 16/1824; G06F 16/119

USPC ....................................................... 713/1, 100
See application file for complete search history.

(56) References Cited

U.S. PATENT DOCUMENTS

| | | | | |
|---|---|---|---|---|
| 6,687,718 B2* | 2/2004 | Gagne | .................. | G06F 11/1466 714/E11.12 |
| 7,321,939 B1* | 1/2008 | Porter | .................. | G06Q 10/107 709/217 |
| 7,760,746 B2* | 7/2010 | Betts | ...................... | H04L 41/12 370/408 |
| 7,788,665 B2* | 8/2010 | Oshins | ................ | G06F 9/45558 718/1 |
| 8,380,853 B2 | 2/2013 | Kudo | | |
| 8,966,465 B2 | 2/2015 | Konduri | | |
| 9,171,053 B2 | 10/2015 | Cai et al. | | |
| 9,356,852 B2 | 5/2016 | Neuse et al. | | |
| 9,727,432 B1* | 8/2017 | Cutforth | ............. | G06F 11/0727 |
| 9,778,952 B1* | 10/2017 | Sutton | ...................... | G06F 9/541 |
| 9,851,986 B2 | 12/2017 | Chen et al. | | |
| 9,917,736 B2 | 3/2018 | Jubran et al. | | |

(Continued)

OTHER PUBLICATIONS

Zhou et al, "Cascaded Parsing of Human-Object Interaction Recognition", IEEE, pp. 1-14 (Year: 2020).*

(Continued)

*Primary Examiner* — Anil Khatri

(74) *Attorney, Agent, or Firm* — Yee & Associates, P.C.

(57) ABSTRACT

A method for data configuration is provided. The method comprises parsing a first cascading configuration associated with a data source and selecting content of the first cascading configuration to migrate to a data target. The selected content of the first cascading configuration is then migrated to a second cascading configuration, and the second cascading configuration is applied to the data target.

15 Claims, 6 Drawing Sheets

(56) References Cited

U.S. PATENT DOCUMENTS

| | | | | |
|---|---|---|---|---|
| 10,127,141 | B2* | 11/2018 | Kalyanasundram | G06F 11/263 |
| 10,133,593 | B1* | 11/2018 | Sethuramalingam | |
| | | | | G06F 9/45558 |
| 10,339,523 | B2* | 7/2019 | McDonough | G06Q 20/12 |
| 10,949,451 | B2* | 3/2021 | Giuffrida | G06F 16/29 |
| 11,030,063 | B1* | 6/2021 | Shipilov | G06F 3/067 |
| 11,061,942 | B2* | 7/2021 | Watts | G06F 16/9038 |
| 11,281,624 | B1* | 3/2022 | Paterra | H04L 67/42 |
| 11,334,063 | B2* | 5/2022 | Celia | G06N 3/088 |
| 2006/0130050 | A1 | 6/2006 | Betts et al. | |

OTHER PUBLICATIONS

Zhu et al, "A Dynamic Game-Theoretic Approach to Resilient Control System Design for Cascading Failures", ACM, pp. 41-46 (Year: 2012).*

Zhao et al, "Modeling Roles with Cascade", IEEE, pp. 86-93 (Year: 1999).*

Feldman, "Enterprise Wrappers for Information Assurance", IEEE, pp. 1-3 (Year: 2003).*

Khuller et al, "Algorithms for Data Migration with Cloning", ACM, pp. 27-36 (Year: 2003).*

Hao et al, "Dynamic Service and Data Migration in the Clouds", IEEE, pp. 134-139 (Year: 2009).*

Carreira et al,"Efficient development of data migration transformations", ACM, pp. 1-2 (Year: 2004).*

Badros et al., "Constraint Cascading Style Sheets for the Web", ACM, pp. 73-82 (Year: 1999).*

"Cascading Configuration Patter," T. C. Mits 108, The celebrated man in the street, accessed Nov. 19, 2019, 8 pages. http://octodecillion.com/blog/cascadeconfigpattern/.

Mell et al., "The NIST Definition of Cloud Computing", Computer Security Division, National Institute of Standards and Technology, Jan. 2011, 7 pages.

* cited by examiner

CASCADING DATA CONFIGURATION AND DATA MIGRATION

BACKGROUND

The disclosure relates generally to data management and more specifically to data migration between different computing environments.

Many data storage and service implementations require repeated configuration in multiple data centers, multi-cloud computing environments, or serverless container environments such as Domain Name System (DNS), Lightweight Directory Access Protocol (LDAP), Database (DB) connection, application configuration, etc. These configuration efforts might be related to updates and migrations and typically require master technical configuration knowledge. Typically, a restart to services is required to enable the new configuration.

Some configurations vary by environment and are tightly coupled and bound with specific servers and applications. As a result, for traditional data centers a server restart is often required to enable a new configuration after update or migration.

SUMMARY

An illustrative embodiment provides a computer-implemented method for data configuration. The method comprises parsing a first cascading configuration associated with a data source and selecting content of the first cascading configuration to migrate to a data target. The selected content of the first cascading configuration is then migrated to a cascading second configuration, and the second cascading configuration is applied to the data target.

Another illustrative embodiment provides a computer program product for data configuration. The computer program product comprises a non-volatile computer readable storage medium having program instructions embodied therewith. The program instructions executable by a number of processors to cause a computer to perform the steps. A first cascading configuration associated with a data source is parsed. Content of the first cascading configuration is selected to migrate to a data target. The selected content of the first cascading configuration is migrated to a second cascading configuration. The second cascading configuration is applied to the data target.

Another illustrative embodiment provides a system for data configuration. The system comprises a bus system, a storage device that stores program instructions connected to the bus system, and a number of processors that executes the program instructions connected to the bus system. A first cascading configuration associated with a data source is parsed. Content of the first cascading configuration is selected to migrate to a data target. The selected content of the first cascading configuration is migrated to a second cascading configuration. The second cascading configuration is applied to the data target.

DETAILED DESCRIPTION

Figure 1:
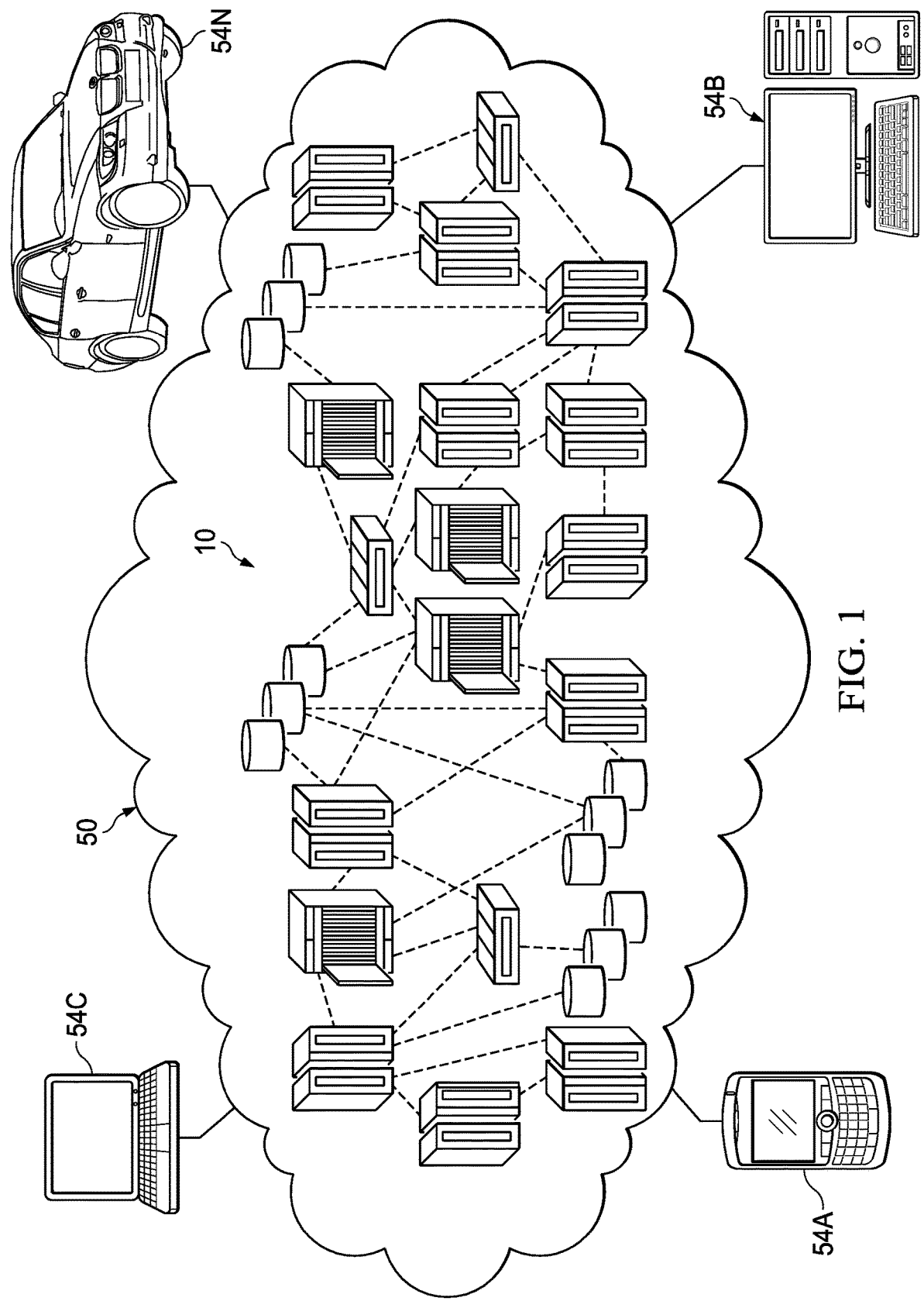
FIG. 1 depicts a cloud computing environment in accordance with an illustrative embodiment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
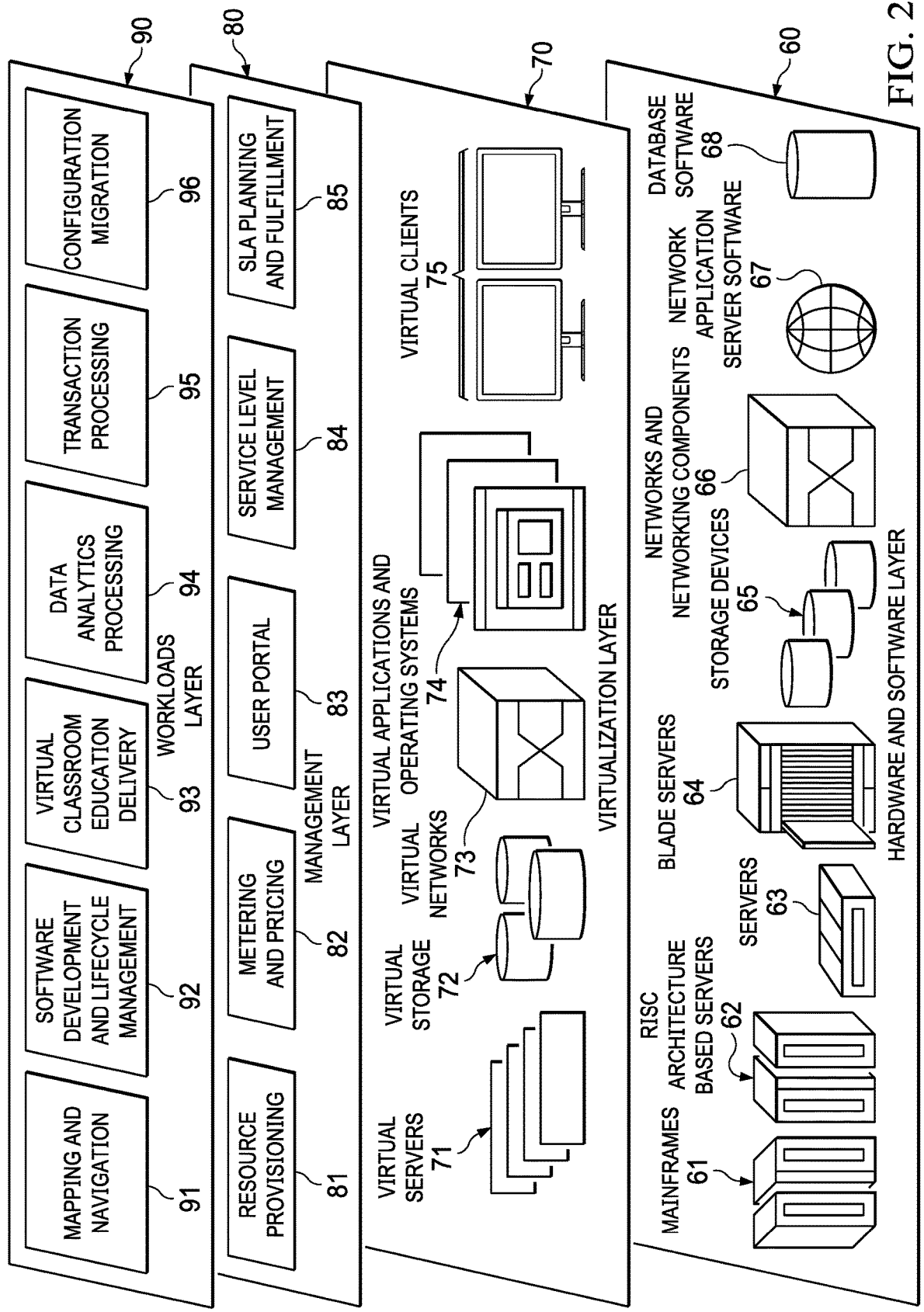
FIG. 2 depicts a set of functional abstraction layers in accordance with an illustrative embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and configuration migration 96. Configuration migration 96 provides a service for updating and migrating data configurations that are located in cloud computing environment 50 in FIG. 1.

The illustrative embodiments recognize and take into account one or more different considerations. Illustrative embodiments recognize and take into account that many data storage and service implementations require repeated configuration for updates and migrations.

Illustrative embodiments also recognize and take into account that configuration updating and migrating require a high level of technical knowledge and is often error prone and may not function properly if the configuration is not set properly.

Illustrative embodiments also recognize and take into account that some configurations vary by environment, making it difficult to migrate a configuration from one environment to another using existing configurations tools for configurations that are tightly coupled with servers and applications.

Illustrative embodiments recognize and take into account that regardless of data center, multi-cloud, or serverless computing, a restart to services is required to enable the new configuration. For traditional data center, a server restart might be required since the configurations are tightly bound with particular servers and applications.

Illustrative embodiments provide cascading configurations that are set up in a cascading configuration broker that is decoupled from servers/containers. The relationship of server/container with configurations is independent but tightly integrated. The cascading configuration broker is implemented above the server/container management layer. The configuration broker restructures the configuration installation and migration to provide configuration management. The resulting configuration can be migrated or updated with cascading style very easily.

In the illustrative embodiments, the relationship of a configuration to the server/container is similar to the relationship of cascading style sheet (CSS) to hypertext markup language (HTML). As a result, updating or migrating configurations is as easy as applying new styles with CSS The illustrative embodiments provide a cascading configuration "brush," which can migrate the configuration among servers and containers through a graphical user interface (GUI) action. As a result, computing environment administrators do not need to know the internal technical configuration. The administrator only needs to employ the "config brush" through the interface to avoid error prone operations. The configuration can be then migrated to a new target.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 3:
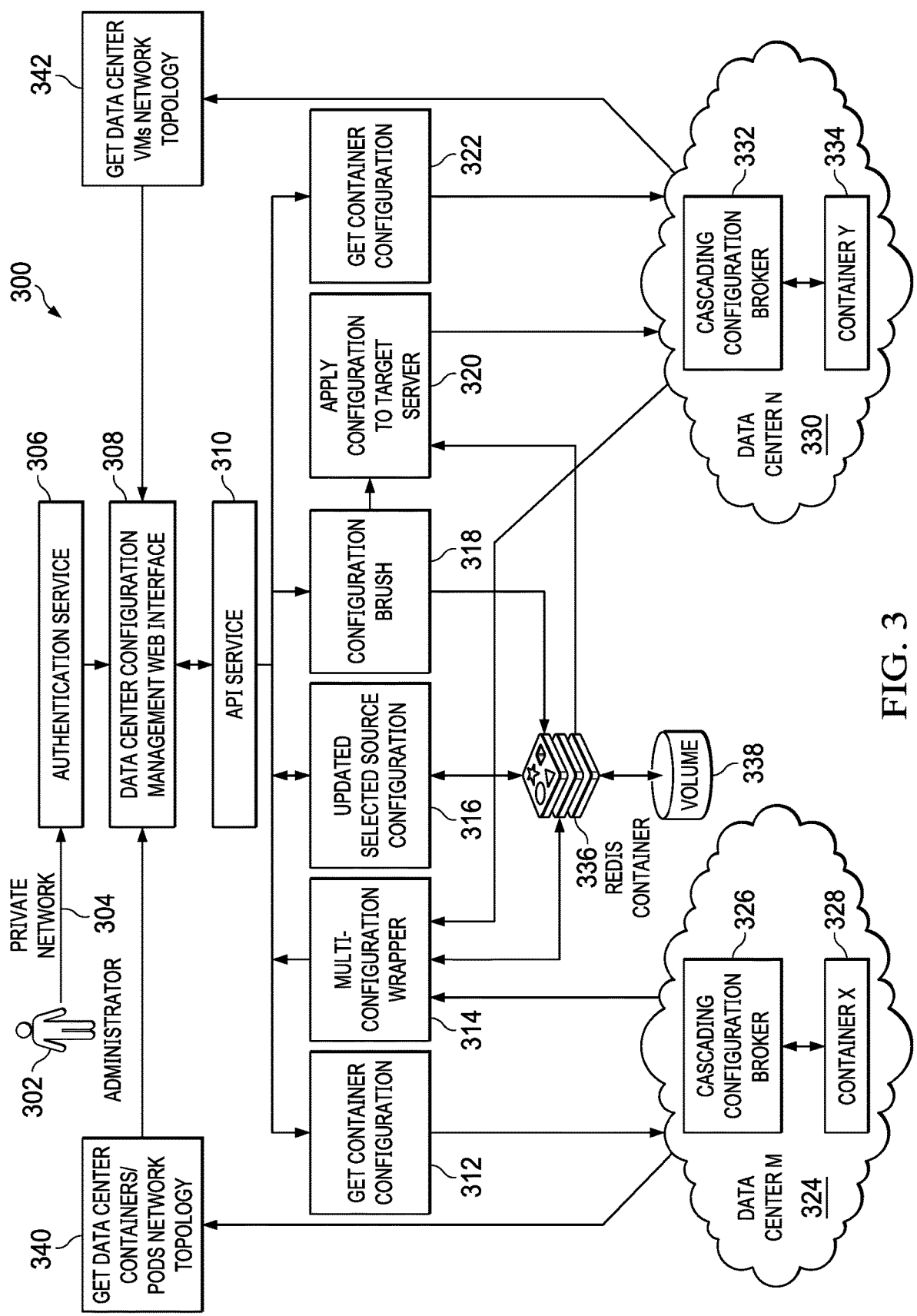
FIG. 3 illustrates a block diagram of an architecture for configuration migration in accordance with an illustrative embodiment.

FIG. 3 illustrates a block diagram of an architecture for configuration migration in accordance with an illustrative embodiment. Architecture 300 can be used to implement configuration migration 96 in workloads layer 90 in FIG. 2 for cloud computing environment 50 in FIG. 1.

Architecture 300 allows an environment administrator 302 to conveniently migrate configurations between a data source and a data target without specialize technical knowledge. Configuration administrator 302 can use a private network 304 or Virtual Private Network (VPN) to access authentication service 306 and authenticate and log in to data center configuration management web interface 308.

Configuration management interface 308 is able to fetch data center network topologies from all managed data centers, including container/PoD network topology 340 from data center M 324 and virtual machine (VM) network topology 342 from data center N 330. These fetched data center network topologies 340, 342 can be displayed to the administrator 302 by configuration management interface 308 using active graphs.

Application programming interface (API) service 310 handles each administrator web request. Administrator 302 can view each of Container/point of delivery (PoD)/Server configuration in web interface 308. When administrator 302 requests the container configurations for source data center M 324 and target data center N 330, API service 310 has Get Container Configuration modules 312, 322 send a request to the required container/PoD/server in source data center M 324 and target data center N 330, respectively.

In response to this request, cascading configuration broker 326 in data center M 324 submits the configuration contents of container X 328 to Multi-configuration Wrapper 314 to group and organize. Multi-configuration wrapper 314 then responds to API service 310, which in turn present the configuration content in web interface 308.

Configuration administrator 302 can update selected source configuration content in web interface 308 to match a target Container/PoD/VM, e.g., container Y 334, in target data center 330. When an update is made by administrator 302, API service 310 makes an API call to Update Selected Source Configuration module 316, which stores each change in Redis Database Container 336. Redis Database Container 336 mounts one volume 338 for data persistence.

Configuration administrator 302 uses Configuration Brush 318 to migrate the selected source Container/PoD/Server configurations or updated configurations. Configuration Brush 318 stores the source Container/PoD/Servers configuration content ID in Redis Database Container 336 and chooses the target Container/PoD/Server Y 334 in data center 330, which is sent to Apply Configuration to Target Server module 320.

Apply Configuration to Target Server module 320 queries the Redis Database Container 336 for the selected content ID and migrates the changes and applies the new configuration to the cascading configuration broker 332 of target container Y 334.

Figure 4:
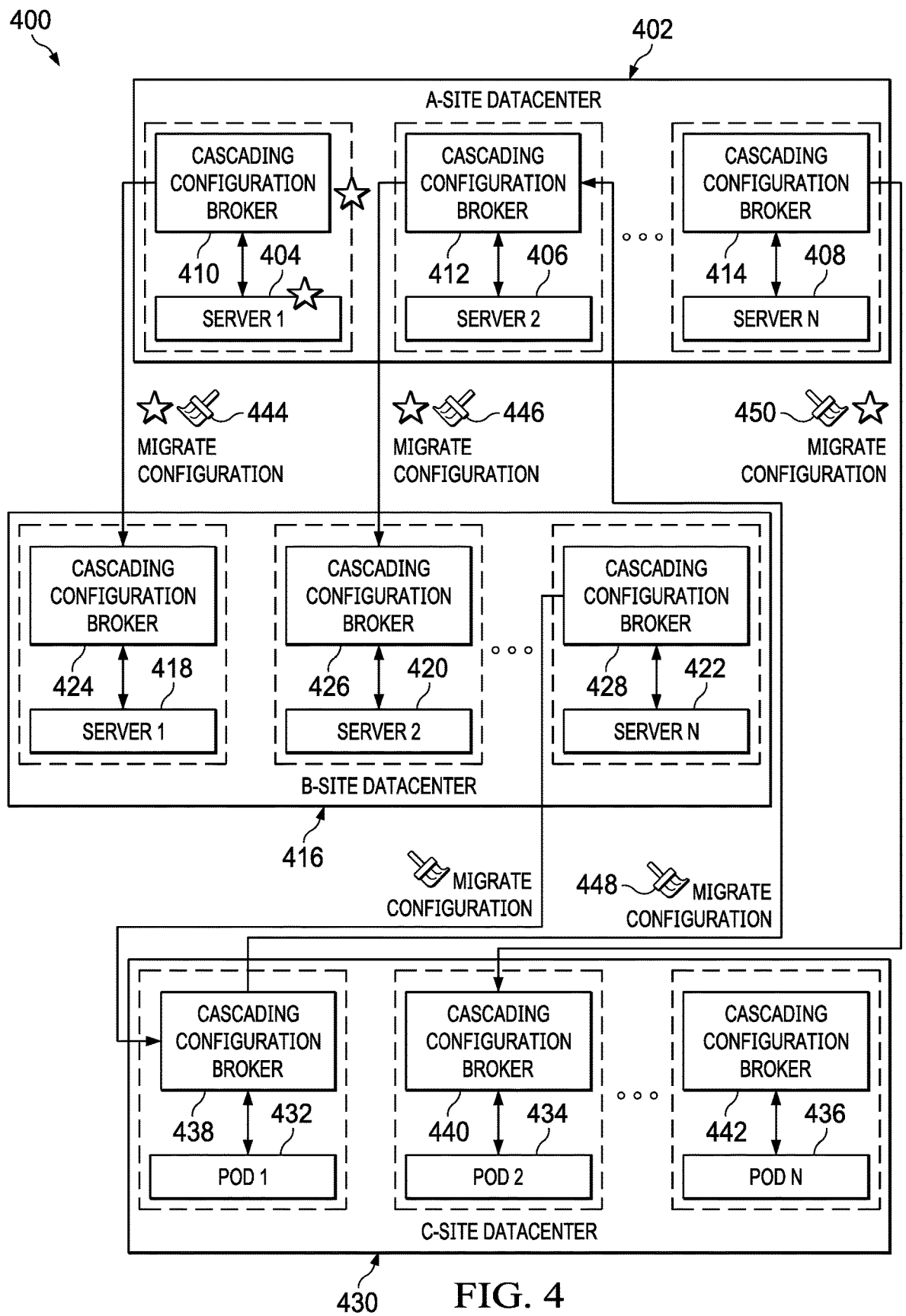
FIG. 4 illustrates an architecture for data centers employing cascading configuration brokers in accordance with an illustrative embodiment.

FIG. 4 illustrates an architecture for data centers employing cascading configuration brokers in accordance with an illustrative embodiment. Architecture 400 is an example of data center architecture that might be used for data centers M 324 and N 330 in FIG. 3.

A-site data center 402 comprises a number of servers 404, 406, 408, each of which has an associated cascading configuration broker 410, 412, 414, respectively. Similarly, B-site data center 416 comprises servers 418-422, each with respective configuration brokers 424-428. Likewise, C-site data center 430 comprises PoDs 432-436 with respective cascading configuration brokers 438-442.

Cascading configuration brokers are in charge of all configuration management on their respective servers/PoD/container. Configuration is managed in a cascading style for easy migration or updating. Generally speaking, cascading refers to an algorithm that defines how to combine values originating from different sources. The name cascading derives from the specified priority scheme used to determine which rule applies if more than one rule matches a particular element. The cascading scheme is predictable. Cascading is perhaps best known for its use with cascading style sheet (CSS) in website coding in which CSS enables the separation of presentation and content such as layout, colors, and fonts. Whereas HMTL provides structure for a web document content, CSS defines the style with which document elements are presented. Just a CSS can be changed for a given HTML structure for a web page, the illustrative embodiments employ cascading in an analogous manner to change data configurations for servers/Pods/containers.

Similar to the relationship between CSS and HTML, in the illustrative embodiments, the cascading configuration broker of each server or container works independently of the server/container but closed with it. The cascading configuration broker is implemented over the layer of server/container management. Therefore, updating the configuration for an environment is analogous to updating the CSS for an HTML web page. The underlying server/Pod/container running underneath the cascading broker has not impact.

Configuration brushes 444, 446, 448, 450 can be used to migrate configurations from one cascading configuration broker to another, and hence between the underlying servers/Pods/containers. A configuration brush is an element in the user interface that allows selection of the contents to parse and migrate and activates the migration process, simplifying the migration process for the environment administrator. While updating or migrating the configuration from a data source to a data target, the user selects the data source through the interface. By activating the configuration brush in the interface, the user can view the configuration details of the selected content, which are organized in a cascading manner. The configuration brush allows the user to simply migrate the whole content directly to a data target, select a portion of the content to migrate, and/or customize or update the configuration and then migrate if needed.

Figure 5:
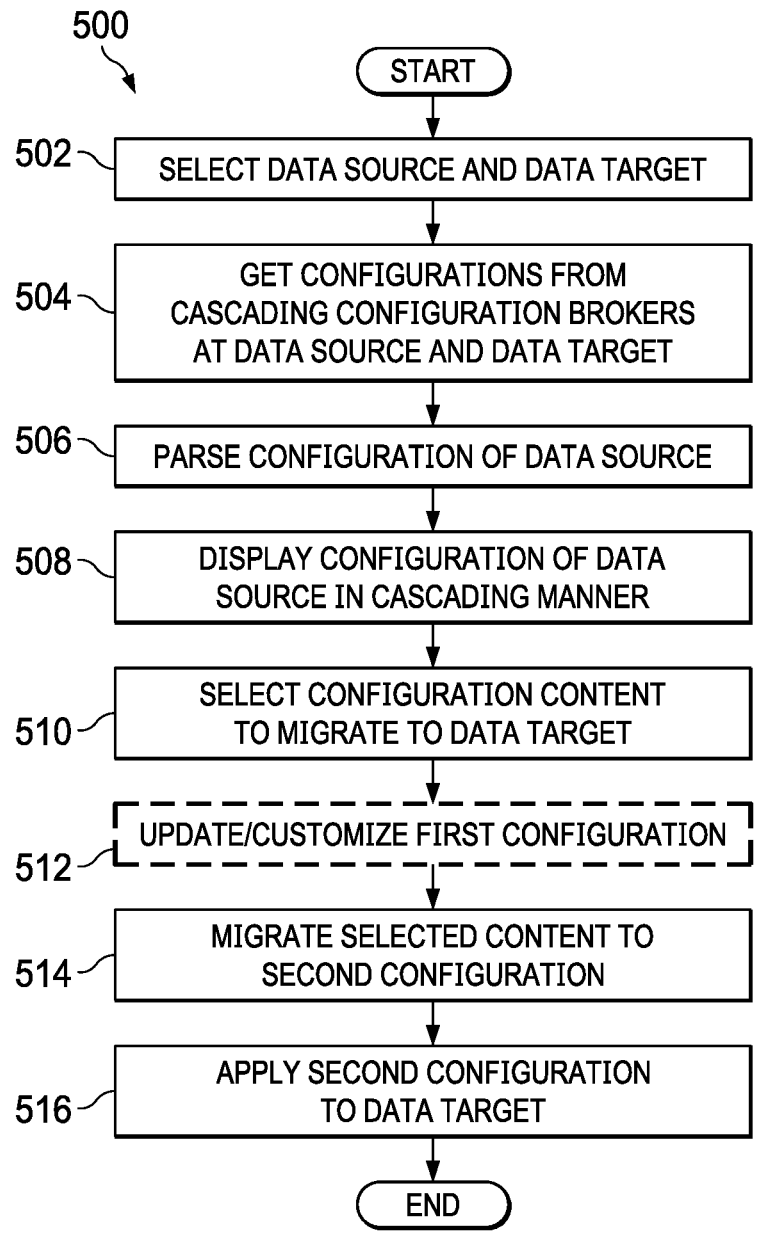
FIG. 5 illustrates a flowchart of a process for cascading data configuration migration in accordance with an illustrative embodiment.

FIG. 5 illustrates a flowchart of a process for cascading data configuration migration in accordance with an illustrative embodiment. Process 500 can be implemented using architecture 300 shown in FIG. 3 and architecture 400 shown in FIG. 4.

Process 500 begins by selecting a data source and a data target (step 502). The data source and data target might be at different data centers or at the same data center. For example, the data source might a first server associated with a first data center, and the data target might a second server associated with the first data center or a second data center. Similarly, the data source might be a first cloud container associated with a first server, and the data target might be a second cloud container associated with the first server or a second server.

The respective cascading configurations of the data source and data target are retrieved from respective cascading configuration brokers at the data source and data target (step 504). The cascading configurations are managed by the respective cascading configuration brokers operating above management layers of the data source and data target.

The configuration of the data source is parsed (step 506), and its cascading structure is displayed to the user on the interface (step 508). The user can then use a configuration brush in the interface to select configuration content to migrate to the data target (step 510). The user might choose to select all of the configuration content from the data for migration or might select a subset portion of the content to migrate to the data target.

The user might optionally use the configuration brush to customize or update the configuration of the selected content before migrating (step 512). With the configuration brush the user can call a configuration parser/translation in a pop-up text field in the interface to edit the source configuration.

Once the selected configuration content is ready it is migrated from the first configuration or user customized configuration to a second configuration (step 514). The second configuration is then applied to the data target (step 516).

The cascading configuration migration of the illustrative embodiments provide the technical improvement of allowing easy migration and updating of data configurations for massive servers or multi-data centers and multi-cloud implementation by avoiding the need to perform repeat work. By decoupling the cascading configurations from the underlaying servers/PoDs/containers, the illustrative embodiments allow easy migration and updating of configurations similar to updating CSS for web pages. Using cascading configuration brokers allows administrators to avoid service/server restarts in order to enable the new configuration, thereby allowing for zero down time.

By using cascading style configuration management, each configuration item can be updated and maintained easily, allowing the administrator to handle configuration variations by environment. By providing a concise and user-friendly interface, the illustrative embodiments allow administrators to configurations without the need for master technical knowledge. The cascading brush GUI action avoids error prone operations, resulting in lower costs and saving human resources and time.

Figure 6:
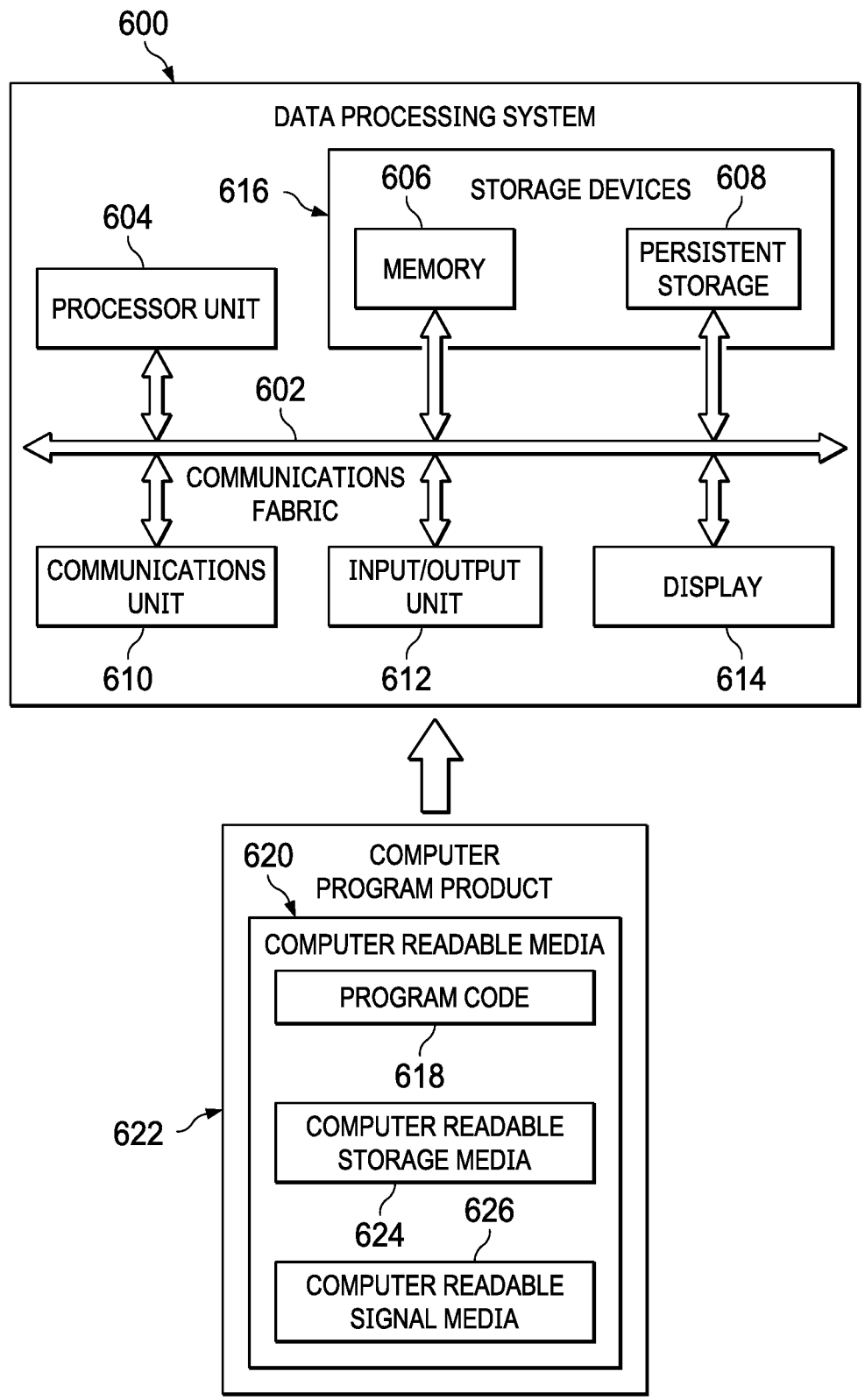
FIG. 6 is a diagram of a data processing system is depicted in accordance with an illustrative embodiment.

Turning to FIG. 6, a diagram of a data processing system is depicted in accordance with an illustrative embodiment. Data processing system 600 is an example of a system in which computer-readable program code or program instructions implementing processes of illustrative embodiments may be run. Data processing system 600 can also be used to implement cloud computing nodes 10 in FIG. 1. In this illustrative example, data processing system 600 includes communications fabric 602, which provides communications between processor unit 604, memory 606, persistent storage 608, communications unit 610, input/output unit 612, and display 614.

Processor unit 604 serves to execute instructions for software applications and programs that may be loaded into memory 606. Processor unit 604 may be a set of one or more hardware processor devices or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in this example, provides for communication with other computers, data processing systems, and devices via network. Communications unit 610 may provide communications using both physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 600.

Input/output unit 612 allows for the input and output of data with other devices that may be connected to data processing system 600. For example, input/output unit 612 may provide a connection for user input through a keypad, keyboard, and/or some other suitable input device. Display 614 provides a mechanism to display information to a user and may include touch screen capabilities to allow the user to make on-screen selections through user interfaces or input data, for example.

Instructions for the operating system, applications, and/or programs may be located in storage devices 616, which are in communication with processor unit 604 through communications fabric 602. In this illustrative example, the instructions are in a functional form on persistent storage 608. These instructions may be loaded into memory 606 for running by processor unit 604. The processes of the different embodiments may be performed by processor unit 604 using computer-implemented program instructions, which may be located in a memory, such as memory 606. These program instructions are referred to as program code, computer-usable program code, or computer-readable program code that may be read and run by a processor in processor unit 604. The program code, in the different embodiments, may be embodied on different physical computer-readable storage devices, such as memory 606 or persistent storage 608.

Program code 618 is located in a functional form on computer-readable media 620 that is selectively removable and may be loaded onto or transferred to data processing system 600 for running by processor unit 604. Program code 618 and computer-readable media 620 form computer program product 622. In one example, computer-readable media 620 may be computer-readable storage media 624 or computer-readable signal media 626. Computer-readable storage media 624 may include, for example, an optical or magnetic disc that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory that is connected to data processing system 600. In some instances, computer-readable storage media 624 may not be removable from data processing system 600.

Alternatively, program code 618 may be transferred to data processing system 600 using computer-readable signal media 626. Computer-readable signal media 626 may be, for example, a propagated data signal containing program code 618. For example, computer-readable signal media 626 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 618 may be downloaded over a network to persistent storage 608 from another device or data processing system through computer-readable signal media 626 for use within data processing system 600. For instance, program code stored in a computer-readable storage media in a data processing system may be downloaded over a network from the data processing system to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer-readable storage device in data processing system 600 is any hardware apparatus that may store data. Memory 606, persistent storage 608, and computer-readable storage media 624 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for changing data configuration among servers, the method comprising:
   executing, by a number of processors, program instructions to perform the method of:
   parsing, by the number of processors, a first cascading data configuration associated with a data source server;
   selecting, by the number of processors, data of the first cascading data configuration to migrate to a data target server;
   updating, by the number of processors, the first cascading data configuration;

migrating, by the number of processors, the selected data of the first cascading data configuration to the data target server having a second cascading data configuration; and applying, by the number of processors, the first cascading data configuration to the data target server having the second cascading data configuration, wherein the first cascading data configuration is managed by a first cascading data configuration broker that is associated with but independent from the data source server and the second cascading data configuration is managed by a second cascading data configuration broker that is associated with but independent from the data target server, and wherein the first cascading data configuration broker associated with but independent from the data source server operates above a management layer of the data source server and the second cascading data configuration broker associated with but independent from the data target server operates above a management layer of the data target server and avoids restart of the data target server when the second cascading data configuration broker applies the first cascading data configuration to the data target server.

2. The method of claim 1, wherein the data source server is associated with a first data center and the data target server is associated with the first data center or a second data center.

3. The method of claim 1, wherein the data source server is associated with a first cloud container and the data target server is associated with a second cloud container.

4. The method of claim 1, wherein migrating the selected data is performed by a cascading configuration brush activated via a user interface.

5. The method of claim 1, further comprising:
customizing the first cascading data configuration via a user interface before migrating the selected data to the data target server having the second cascading data configuration.

6. A computer program product for changing data configuration among servers, the computer program product comprising:
a non-transitory computer readable storage medium having program instructions embodied therewith, the program instructions executable by a number of processors to cause the number of processors to perform a method of:

parsing a first cascading data configuration associated with a data source server;

selecting data of the first cascading data configuration to migrate to a data target server;

updating the first cascading data configuration;

migrating the selected data of the first cascading data configuration to the data target server having a second cascading data configuration; and applying the first cascading data configuration to the data target server having the second cascading data configuration, wherein the first cascading data configuration is managed by a first cascading data configuration broker that is associated with but independent from the data source server and the second cascading data configuration is managed by a second cascading data configuration broker that is associated with but independent from the data target server, and wherein the first cascading data configuration broker associated with but independent from the data source server operates above a management layer of the data source server and the second cascading data configuration broker associated with but independent from the data target server operates above a management layer of the data target server and avoids restart of the data target server when the second cascading data configuration broker applies the first cascading data configuration to the data target server.

7. The computer program product of claim 6, wherein the data source server is associated with a first data center and the data target server is associated with the first data center or a second data center.

8. The computer program product of claim 6, wherein the data source server is associated with a first cloud container and the data target server is associated with a second cloud container.

9. The computer program product of claim 6, wherein migrating the selected data is performed by a cascading configuration brush activated via a user interface.

10. The computer program product of claim 6, further comprising program instructions for customizing the first cascading data configuration via a user interface before migrating the selected data to the data target server having the second cascading data configuration.

11. A system for changing data configuration among servers, the system comprising:
a bus system;
a storage device connected to the bus system, wherein the storage device stores program instructions; and
a number of processors connected to the bus system, wherein the number of processors executes the program instructions to:

parse a first cascading data configuration associated with a data source server;

select data of the first cascading data configuration to migrate to a data target server;

update the first cascading data configuration;

migrate the selected data of the first cascading data configuration to the data target server having a second cascading data configuration; and apply the first cascading data configuration to the data target server having the second cascading data configuration, wherein the first cascading data configuration is managed by a first cascading data configuration broker that is associated with but independent from the data source server and the second cascading data configuration is managed by a second cascading data configuration broker that is associated with but independent from the data target server, and wherein the first cascading data configuration broker associated with but independent from the data source server operates above a management layer of the data source server and the second cascading data configuration broker associated with but independent from the data target server operates above a management layer of the data target server and avoids restart of the data target server when the second cascading data configuration broker applies the first cascading data configuration to the data target server.

12. The system of claim 11, wherein the data source server is associated with a first data center and the data target server is associated with the first data center or a second data center.

13. The system of claim 11, wherein the data source server is associated with a first cloud container and the data target server is associated with a second cloud container.

14. The system of claim 11, wherein migrating the selected data is performed by a cascading configuration brush activated via a user interface.

15. The system of claim 11, wherein the number of processors further execute the program instructions to:
  customize the first cascading data configuration via a user interface before migrating the selected data to the data target server having the second cascading data configuration.

* * * * *